United States Patent Office 3,320,258
Patented May 16, 1967

3,320,258
THIAMINE PANTETHEINE DISULFIDE DERIVATIVES
Hiroshi Hirano, Tokyo, Shojiro Yurugi, Kyoto, Hiroyuki Asakawa, Suita, and Yoshikazu Oka, Amagasaki, Japan, assignors to Takeda Chemical Industries, Ltd., Osaka, Japan
No Drawing. Filed Dec. 21, 1964, Ser. No. 420,187
Claims priority, application Japan, Dec. 26, 1963, 38/70,406
2 Claims. (Cl. 260—256.5)

This invention relates to new disulfide-type thiamine derivatives.

In its broader aspect, the invention relates to thiamine pantetheine disulfides of the formula

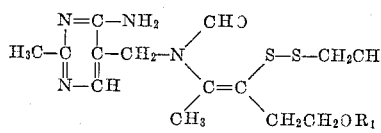 S—S—CH$_2$CH$_2$NHCOCH$_2$CH$_2$NHCO—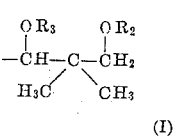

(I)

wherein each of $R_1$, $R_2$ and $R_3$ represents H or acyl, i.e. RCO— derived from carboxylic acid, with up to 7 carbon atoms, at least one of $R_2$ and $R_3$ being acyl, and to the preparation thereof. In a more specific aspect of the invention, R, in the RCO— group, stands for H or lower alkyl (methyl, propyl, butyl, etc.), lower alkoxycarbonyl (methoxy, ethoxy, propoxy, etc.), benzoyl, furoyl, furfuroyl, etc. groups with up to 7 carbon atoms.

Heretofore, it has been known that pantetheine, which is also called *Lactobacillus bulgaricus* factor (LBF), is a factor to promote the growth of certain microorganisms and an important substance as an intermediate in a biochemical pathway to co-enzyme A. It is also known that some disulfide-type thiamine derivatives having disulfide linkage between the mercapto group of a thiol type thiamine and an alkylmercapto compound show superior therapeutic effects in comparison with thiamine.

The object of this invention is to provide the new thiamine derivatives represented by general Formula I which have superior therapeutic effects relative to both thiamine and pantetheine. Another object is to provide a method for preparing the same. Further objects will be clear from the description mentioned below.

Typical thiamine pantetheine disulfides of this invention are the following presently preferred compounds:

thiamine γ-benzoylpantetheine disulfide;
thiamine α-acetyl-γ-benzoylpantetheine disulfide;
thiamine α,γ-diacetylpantetheine disulfide;
thiamine α,γ-dipropionylpantetheine disulfide;
thiamine α-formyl-γ-benzoylpantetheine disulfide;
O-acetylthiamine γ-benzoylpantetheine disulfide;
O-acetylthiamine γ-acetylpantetheine disulfide;
O-acetylthiamine α,γ-diacetylpantetheine disulfide;
O-benzoylthiamine γ-acetylpantetheine disulfide;
O-benzoylthiamine γ-benzoylpantetheine disulfide;
O-benzoylthiamine α,γ-diacetylpantetheine disulfide;
etc.

In the preparation of compounds (I) of this invention, one reactant having the formula

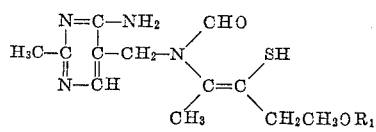
(II)

wherein $R_1$ is as precedingly defined, is allowed to react with another reactant (pantetheine or derivative thereof) having the formula

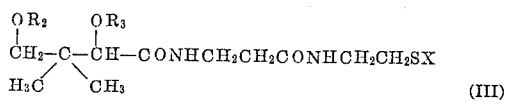
(III)

wherein $R_2$ and $R_3$ are as precedingly defined, at least one of $R_2$ and $R_3$ being acyl, and X is an active radical which forms a disulfide structure by reaction with the mercapto radical of the compound having the Formula (II). For example X stands for —SO$_3$M, —SO$_2$R', —SOR', —SCN,

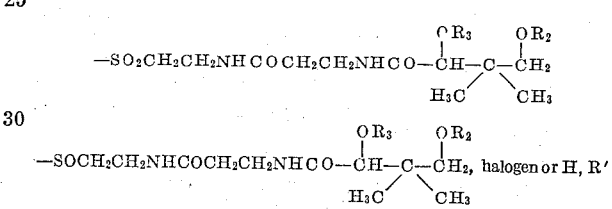

being a hydrocarbon radical having up to 7 carbon atoms such as methyl, ethyl, propyl, phenyl, tolyl, etc. and M is an alkali metal, univalence of alkaline earth metal or —MR'R" where each of R' and R" is a hydrocarbon radical as previously defined for R', or H.

More concretely, typical pantetheine derivatives of Formula (III), one of the reactants, are exemplified by the following:

sodium salt of α,γ-diacetyl-S-sulfopantetheine;
potassium salt of α-acetyl-γ-benzoyl-S-sulfopantetheine;
sodium salt of γ-furoyl-S-sulfopantetheine;
triethylammonium salt of S-sulfopantetheine;
γ-benzoyl-S-cyanopantetheine;
γ-benzoylpantetheine;
α-propionyl-γ-furoyl-S-p-tolyl-sulfopantetheine;
α-acetyl-γ-benzoylpantetheine sulfoxide; etc.

Among the pantetheine derivatives above mentioned, those wherein X stands for —SO$_3$M are most advantageously employed.

The pantetheine derivatives (III) wherein X is —SO$_3$M are prepared by reacting pantothenoyl ethyleneimine derivatives having the formula:

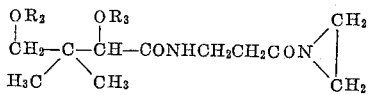

wherein $R_2$ and $R_3$ are as precedingly defined, with a compound having the formula M$_2$S$_2$O$_3$, wherein M has the significance previously set forth.

Potassium thiocyanate can also be used instead of M$_2$S$_2$O$_3$ to give the corresponding pantetheine derivatives.

The reaction of the present invention is carried out in an aqueous medium, but if desired it can be carried out in an organic solvent such as methanol, ethanol, dimethylformamide, etc. or in a mixture of water and such organic solvent.

In order to carry out the reaction continuously, it is preferable to remove the disulfide compounds of this invention from the reaction system, because otherwise the reaction may reach an equilibrium with the result that continuous reaction is hindered. To withdraw the disulfide derivatives of this invention from the reaction mixture, resort can be had to the expedient of adding another solvent which can dissolve the disulfide derivatives of this invention, but which is immiscible with the initial solvent. As such solvent, chloroform, ethylacetate, benzene, etc. can advantageously be employed, when water is the initial solvent used.

It is generally known that when thiamine or its related compounds exist in a solution, equilibrium between the thiazolium type and the thio type, to which disulfide derivatives of this invention belong, is observed, and that equilibrium shifts to the thio type under alkaline conditions. Accordingly, the reaction of this invention takes place under neutral or alkaline conditions. Especially it is preferable to carry out the reaction at an alkaline pH by adding an alkaline reagent such as sodium hydroxide, potassium hydroxide, ammonia, organic bases such as pyridine, aniline, etc.

When the pantetheine derivative having the Formula (III) wherein X is H is used as one of the reactants of this invention, it is preferable that an oxidizing agent such as iodine, hydrogen peroxide, etc. be employed. Generally, the reaction proceeds smoothly at room temperature (about 20° to 30° C.). However, when necessary, it may be carried out with cooling or heating, so as to control the reaction velocity.

The disulfide type derivatives of this invention thus prepared may be isolated, if desired. Generally, the isolation is carried out by utilizing the difference in solubility in a solvent, or difference in distribution coefficent, etc., between the objective compounds and impurities. Depending on necessity, such a means as condensation of the reaction mixture, precipitation by adding any other solvent, or recrystallization, can be carried out.

The thiamine pantetheine disulfide derivatives of the present invention all have superior thiamine activities. They are free from unpleasant odor, are well absorbed from intestines, transferred to the blood and various organs at a high thiamine level, and are not decomposed by aneurinases.

*Test for thiamine activity*

The compounds of this invention were administered for 21 days to rats which had been fed with a thiamine-free diet. As a result of this growth test, it was found that increase in the body weight of the rats thus supplied with the compounds of this invention was the same or greater than that of the rats to whom thiamine itself was administered:

It was also found by actual test that compounds according to this invention have substantially the safe effect on growth of rats as does a corresponding dose of pantothenic acid (e.g. in the form of calcium pantothenate).

The toxicities of the disulfide derivatives (I) of this invention are very low.

For instance, it was observed that they had no hemolytic action and the lethal dose thereof was very low as shown by the following data which were obtained by administration of the compounds (I) of this invention to mice by intraveneous injection:

| | $LD_{50}$ mg./kg. | 95% fiducial limits |
|---|---|---|
| Thiamine γ-benzoylpantetheine disulfide | 370 | 327.4–414.4 |
| Thiamine α-acetyl-γ-benzoylpantetheine disulfide | 255 | 227.6–285.6 |

The products of this invention all have both thiamine activities and pantetheine activities as described in detail hereinbefore, and therefore they may safely and effectively be employed in the therapy of deficiency disorders such as beriberi, neuritis, failure of growth, necrotic lesions of the adrenal cortex, porphyrin staining of hair, graying of hair, edema, etc. and further they may have an activative effect on Krebs cycle.

They may be administered preferably orally after the manner usually employed for thiamine and in comparable amounts.

The following examples set forth presently preferred illustrative, but not limitative, embodiments of the invention. In these examples, parts by weight bear the same relation to parts by volume as do grams to milliliters. Percentages are by weight.

*Example 1*

To a solution of 2.4 parts by weight of γ-benzoylpantethenyl ethyleneimide in 10 parts by volume of ethanol, 1.6 parts by weight of sodium thiosulfate $(Na_2S_2O_3 \cdot 5H_2O)$ dissolved in 10 parts by volume of ethanol was added. After stirring, the resultant solution was alkaline to cresol red reagent.

To the obtained solution, 3.2 parts by volume of 2-normal hydrochloric acid was added dropwise, then the solvent was removed under reduced pressure. The residue was extracted with ethanol to remove sodium chloride.

The ethanol was evaporated under reduced pressure and the residue was dissolved in water and the remaining insoluble portion was removed by extraction with ethyl acetate.

Evaporation of water from the obtained solution gave 1.9 parts by weight of sodium salt of γ-benzoyl-S-sulfopantetheine.

TABLE

| Test Compound | Dose μmol/day/rat | Body Weight (g.) | | | Body Weight Gain (g./rat/week) Mean ± Standard deviation |
|---|---|---|---|---|---|
| | | Before test | After feeding with thiamine-free diet | 21 Days after feeding with diet containing test compound | |
| None | | 50 | 89 | (¹) | |
| Thiamine chloride hydrochloride | 0.01 | 54 | 87 | 95 | 2.6±3.8 |
| Do | 0.02 | 52 | 90 | 131 | 13.8±1.0 |
| Do | 0.04 | 57 | 87 | 167 | 26.8±4.3 |
| Thiamine-benzoyl-pantetheine disulfide | 0.01 | 51 | 87 | 92 | 1.8±1.9 |
| Do | 0.02 | 55 | 87 | 122 | 11.4±3.1 |
| Do | 0.04 | 54 | 87 | 168 | 26.9±7.8 |
| Thiamine α-acetyl-γ-benzoyl-pantetheine disulfide | 0.01 | 49 | 87 | 111 | 8.1±2.5 |
| Do | 0.02 | 51 | 87 | 129 | 13.9±1.7 |
| Do | 0.04 | 51 | 87 | 169 | 27.3±3.5 |

¹ All the rats died after 14.9 days on the average.

To a solution of 8.1 parts by weight of thiamine chloride hydrochloride in 10 parts by volume of water, 2.9 parts by weight of sodium hydroxide dissolved in 8 parts by volume of water was added.

After saturating the obtained solution with sodium chloride, 11.5 parts by weight of sodium salt of γ-benzoyl-S-sulfopantetheine was added to the solution with stirring to throw down resinous precipitate immediately.

After 15 minutes' stirring the precipitate was extracted with 200 parts by volume of chloroform. The extract was washed sufficiently with water and further extracted with dilute hydrochloric acid until the extract became acidic.

The extract was alkalified by the addition of sodium bicarbonate to precipitate oily substance, which was extracted with chloroform. The chloroform layer was washed with water, dried and evaporated. 100 parts by volume of ether was added to thus obtained residue to give 7.2 parts by weight of powdery crystals of thiamine γ-benzoylpantetheine disulfide.

*Analysis.*—Calcd. for $C_{30}H_{42}N_6O_7S_2$: C, 54.36; H, 6.39; N, 12.69. Found: C, 54.26; H, 6.63; N, 12.87.

Example 2

To a solution of 10 parts by weight of thiamine chloride hydrochloride in 15 parts by volume of water, 3.6 parts by weight of sodium hydroxide dissolved in 10 parts by volume of water was added.

16 parts by weight of sodium salt of α-acetyl-γ-benzoyl-S-sulfopantetheine was added to the resultant solution with vigorous agitation to throw down resinous precipitate immediately.

The precipitate was extracted with 150 parts by volume of chloroform, and the extract was washed with water and concentrated to leave a residue.

After being washed twice with 100 parts by volume of ethyl acetate, the residue was dissolved in dilute hydrochloric acid.

The obtained solution was further extracted with 50 parts by volume of ethyl acetate to separate insolubles therefrom and was neutralized with sodium bicarbonate to obtain the crude paste-like product of thiamine α-acetyl-γ-benzoylpantetheine disulfide, which was extracted again with 100 parts by volume of chloroform. The chloroform layer was washed with water, dried and evaporated. 100 parts by volume of ether was added to thus obtained residue to give 10.5 parts by weight of powdery crystals, melting at 85° C.

*Analysis.*—Calcd. for $C_{32}H_{44}O_8N_6S_2$: C, 54.52; H, 6.29; N, 11.92. Found: C, 54.51; H, 6.54; N, 11.84.

Example 3

To a solution of 3.4 parts by weight of thiamine chloride hydrochloride in 5 parts by volume of water, 12 parts by volume of 10% aqueous solution of sodium hydroxide was added, and the mixture was allowed to stand for 30 minutes. After being saturated with sodium chloride, the mixture was supplied with 4.6 parts by weight of sodium S-sulfo-α,γ-di-acetylpantetheine and 30 parts by volume of ethyl acetate.

After 10 minutes' stirring, the ethyl acetate layer was separated, washed with water and extracted three times with 5 parts by volume each of 2-normal hydrochloric acid.

The hydrochloric acid layer was neutralized with sodium bicarbonate and further extracted with ethyl acetate. The extract was washed with water and dried.

Evaporation of the ethyl acetate under reduced pressure and subsequent addition of ether to the residue gave pulverous thiamine α,γ-diacetylpantetheine disulfide.

Example 4

To a solution of 7 parts by weight of γ-benzoylpantetheine in 30 parts by volume of glacial acetic acid, 1.4 parts by weight of 30% aqueous hydrogen peroxide solution was added.

After cooling with ice for one hour, the resultant mixture was allowed to stand overnight at room temperature.

After the addition of water, the reaction mixture was neutralized with sodium bicarbonate to percipitate an oily substance, which was extracted with chloroform. The chloroform layer was washed with water, dried and evaporated to yield 6 parts by weight of the crude γ-benzoylpantetheine sulfoxide.

Thus obtained sulfoxide was dissolved in 50 parts by volume of 50% aqueous ethanol, a solution of 2.8 parts by weight of thiamine chloride hydrochloride in 15 parts by volume of water was added as well as 1 part by volume of 10% aqueous solution of sodium hydroxide, and the whole mixture was then allowed to stand overnight.

After evaporation of ethanol, water was added to the residual solution. Then the mixture was extracted with chloroform and the chloroform layer was further extracted with dilute hydrochloric acid. The extract was treated in the same manner as in Example 1 to give crystals of thiamine γ-benzoylpantetheine disulfide.

Example 5

To a solution of 8.5 parts by weight of γ-benzoylpantetheine in 100 parts by volume of methanol were added 4 parts by volume of 10% aqueous solution of sodium hydroxide and 100 parts by volume of water. To the resultant solution, the mixture of 3.4 parts by weight of thiamine chloride, 12 parts by volume of 10% aqueous solution of sodium hydroxide and 200 parts by volume of water was added with stirring. With further vigorous stirring, iodine solution consisting of 20 parts by weight of iodine, 14 parts by weight of potassium iodide and 200 parts by volume of water was dropped into the reaction mixture to the extent that the latter was continuously colored, followed by extraction with chloroform. The extract was decolorized with sodium bisulfite, washed with water, and further extracted with dilute hydrochloric acid. Then, treatment of the extract in the same manner as in Example 1 gave crystals of thiamine γ-benzoylpantetheine disulfide.

Example 6

To a solution of 3.8 parts by weight of O-acetylthiamine hydrochloride in 5 parts by volume of water, 12 parts by volume of 10% aqueous solution of sodium hydroxide was added.

A solution of 5 parts by weight of sodium salt of S-sulfo-γ-benzoylpantetheine in 5 parts by volume of water was stirred into the above-obtained solution at room temperature, and the stirring was further continued for 15 minutes to give a paste-like precipitate, which was extracted with 30 parts by volume of chloroform.

The extract was sufficiently washed with water, dried with anhydrous sodium sulfate, and concentrated under pressure to leave a residue. 50 parts by volume of ethyl ether was added to the residue to solidify the latter, which was filtered and recrystallized from a mixture of acetone and ethyl ether to yield 3.0 parts by weight of colorless powder of O-acetylthiamine γ-benzoylpantetheine disulfide.

Example 7

To a solution of 4.4 parts by weight of O-benzoylthiamine hydrochloride in 5 parts by volume of water, 12 parts by volume of 10% aqueous solution of sodium hydroxide was added.

5 parts by weight of sodium salt of S-sulfo-γ-benzoylpantetheine dissolved in 5 parts by volume of water was vigorously stirred into the resultant solution at room temperature to give a resinous precipitate, which was extracted with 30 parts by volume of chloroform.

The extract was washed with water, and dried with anhydrous sodium sulfate. The chloroform layer was evaporated under reduced pressure. 50 parts by volume of ethyl ether was added to the residue and left to stand for a while to give crude O-benzoylthiamine γ-benzoylpantetheine disulfide gradually.

The crude product was dissolved with dilute hydrochloric acid and, after the elimination of insolubles, neutralized with sodium bicarbonate to give a resinous precipitate, which was extracted with chloroform and then treated in the same manner as in Example 6 to yield 2.0 parts by weight of crystals.

Having thus disclosed the invention, what is claimed is:

1. Thiamine γ-benzoylpantetheine disulfide.

2. Thiamine α-acetyl-γ-benzoylpantetheine disulfide.

References Cited by the Examiner

UNITED STATES PATENTS 2,752,348   6/1956   Matsukawa et al. ___ 260—256.5

OTHER REFERENCES

Sahashi et al. Jour. of Biochem., vol. 41, No. 4, 1954: pp. 463–467.

ALEX MAZEL, *Primary Examiner.*

MARY U. O'BRIEN, *Assistant Examiner.*